May 29, 1962
A. Y. DODGE
3,036,678
ONE WAY CLUTCHES
Filed Dec. 31, 1959
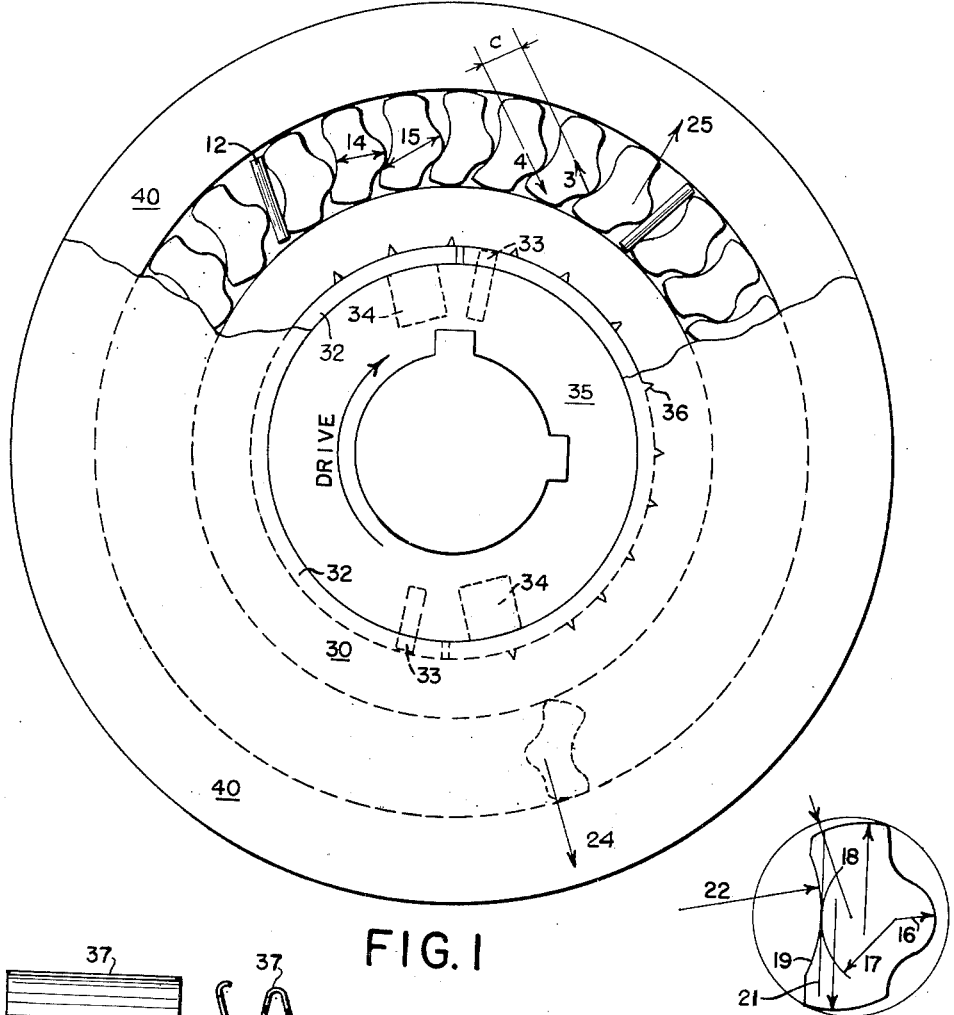
FIG. 1
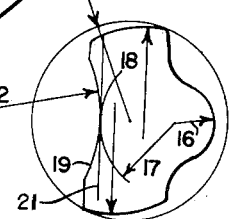
FIG. 2
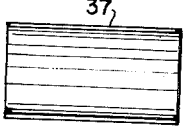 
FIG. 3    FIG. 4
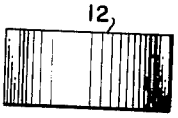
FIG. 5
FIG. 6
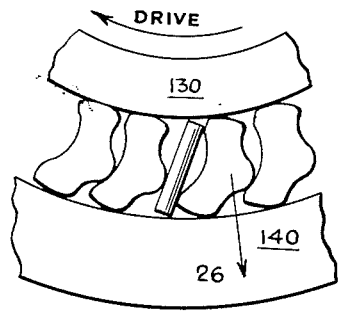
FIG. 7
INVENTOR.
Adiel Y Dodge

United States Patent Office 3,036,678
Patented May 29, 1962

3,036,678
ONE WAY CLUTCHES
Adiel Y. Dodge, 206 S. Main St., Rockford, Ill.
Filed Dec. 31, 1959, Ser. No. 2,320
6 Claims. (Cl. 192—45.1)

The invention relates to one way clutches employing a full complement of sprags, and more particularly, to improved excitation means to initially urge said sprags into engagement.

An object of this invention is to provide a sprag type one way clutch having a full complement of sprags having an excitation spring of new and different character.

Another object is to provide such a sprag type one way clutch in which the sprags are responsive to centrifugal force; i.e., a clutch which may be assembled either to encourage engagement or delay engagement by means of centrifugal force.

Still another object is to provide a sprag having a cross section particularly suitable to meet these objectives.

A further object is to provide a spreader type excitation spring suitable to spread a pair of sprags thereby to tilt into engagement a row of sprags by means of chain action, one sprag acting upon another.

A still further object is to cushion clutch engagement when a shock engagement takes place thereby to protect the mechanism in general and the sprags and races in particular.

A further object is to produce sprags having a desired cross section which may be readily drawn through a die so that the sprags may be produced in long lengths by the drawing process.

A still further object is to produce sprags which will nest together around a circle in a manner such that a spreading force tends to rock each sprag into engagement thereby eliminating the necessity of either garter or ribbon spring, now commonly used.

I accomplish these and other objects as more fully set forth in the accompanying specification and drawings in which:

FIGURE 1 is a diagrammatic cross sectional view of inner and outer races showing sprags assembled therebetween;

FIGURE 2 shows a cross section of my improved sprag;

FIGURE 3 shows a side view of a leaf spring;

FIGURE 4 shows the end view of FIGURE 3;

FIGURE 5 shows the side view of a leaf spring of a simpler design;

FIGURE 6 shows the edge view of FIGURE 5;

FIGURE 7 shows a fragmentary end view having alternative sprag assembly.

Sprags of the conventional D-shaped cross section employed for one way clutches comprising a full complement of sprags may be excited by a leaf spring tending to separate them or spread them apart such as leaf spring 12.

By experience, however, I find that the chain action diminishes after loading three such sprags; therefore, it is desirable to provide a sprag section in which the spreading force acts between sprags in a more positive chain action manner. I have created the sprag cross section shown in FIGURE 2 to better meet these requirements.

The sprag (sections) shown in FIGURE 1 are caused to rock into engagement by a simple leaf spring placed intermediate in a row of sprags. Two, three, or four springs may be employed spaced evenly around the periphery between sprags in a one way clutch. The spreading force of this spring sets up a couple in each sprag to rock them into engagement.

The spreading force acts from one sprag to another in a chain manner in a more positive way. This is due to the greater change of the dimension existing between the contact point of one sprag to the other.

To illustrate this change of dimension, I have shown dimensions 14 and 15 at the top of FIGURE 1. The spreading force tends to rock the sprags. The dimension between sprags decreases as indicated by comparing the dimension 14 with the dimension 15.

As seen in FIGURE 2, the convex face of the sprag is arcuately curved on a radius 16. The concave face of the sprag shown at 19 is arcuately curved on a radius 22 about a center outside of the sprag. An arc 18 struck on the radius 17 about the center of the radius 16 and touching the concave face 22 illustrates the change of circumferential thickness of the sprag as it tilts. It will be noted that the spread between the concave face 22 and the arc 18 is greater than the spread between the arc 18 and a plane tangent to the concave face 22 and radius 18 at their point of contact.

As the sprags tilt, the point of contact between the concave face of one sprag and the convex face of the next adjacent sprag will shift along concave face 19. If the concave face of the sprag were made convex to follow the arc 18 the circumferential thickness of the sprag would remain constant regardless of its tilted position. However, with the sprag having the concave face 19 its radial thickness will increase according to the divergence between the concave face 19 and the arc 18 as the sprag tilts. It will be noted that this divergence is greater than the divergence between the arc 18 and the plane 21 which would be the case if the sprag had a flat rather than a concave face so that the spread of the sprags as they tilt is accentuated over the spread which would occur if the sprags were provided with flat faces.

In addition to the improved interaction of the sprags to tilt each other, the introduction of arc 19 due to radius 22 also reduces the weight of the left side of the sprag as shown in FIGURE 2. This increases the difference of weight between the right side and the left side thereby making the sprag more responsive to centrifugal force.

This concave left side, as seen in FIGURE 2, also permits the use of a greater number of sprags. In this way, three improvements have been caused to occur by making the heretofore flat left side concave; i.e., improved response to spring action and centrifugal force as well as smaller dimension. By smaller dimension, I mean each sprag consumes a smaller space circumferentially.

Referring to the action of centrifugal force upon the sprags in FIGURE 1, the centrifugal force indicated by arrow 25 tends to rock the sprag into engagement thereby cooperating with the action of the excitation spring. But whereas if the sprag is assembled in a different manner, centrifugal force (arrow 26 of FIGURE 7) tends to rock the sprag out of engagement competing with the excitation spring.

It should be realized from these two illustrations that these sprags can be assembled in two different manners— in the first instance so that centrifugal force encourages engagement, or in such a manner that centrifugal force discourages engagement. See arrow 26 of FIGURE 7.

As a matter of fact, these sprags may be assembled in four different manners; i.e., so that the driving action between the inner and outer race (or vice versa) may be clockwise or counterclockwise, and with either positive or negative action due to centrifugal force.

If the sprags are assembled in the manner shown in FIGURE 7, centrifugal force acts to disengage the sprags as previously described. At high speeds, these sprags will hold themselves out of engagement thereby preventing clutch engagement above some pre-determined speed after being disengaged.

As the speed decreases, clutch engagement will occur at some lower speed. A sudden engagement will cause a shock load to occur. In order to limit this shock load, I have employed an inner race 30 engaged by an expansible band 32 anchored by a pair of pins 33 spaced axially. Springs 34 imbedded in hub 35 act to cause band 32 to engage race 30. The amount of torque which may be transmitted between band 32 and inner race 30 may be controlled by the force of springs 34 and by the number of springs employed.

In this manner, both the shock load and the torque load to be transmitted may be limited. This becomes increasingly important when sprags are assembled so that centrifugal force holds them out of engagement temporarily.

Engagement will take place at some reduced speed. It is most apt to take place at a difference in speed existing between the inner race 130 and the outer race 140; hence, a shock load may occur.

Each band 32 provides approximately 180° internal wrap. The race 30 is provided with oil grooves 36 so that the oil film may be squeezed out and carried away.

It should be apparent that a torque limiting band to replace band 32 may be anchored to and surround the outer race instead of being anchored to and surrounding the hub 35. The location of the torque limiting band is a matter of choice. It may be located internally or externally of the one way clutch.

Various spreading means may be employed to set up a tangential spreading force between two sprags. I have shown two forms of such springs. Spring 12 is like that shown in FIGURES 5 and 6. Spring 37, like that shown in FIGURES 3 and 4, is in its spread or open position; it may be used where more movement is required.

It should be noted that both of the springs suggested are so constructed that any wear which may take place due to rubbing the races will take place at an end where wear will do the least amount of damage to the spring.

In this way, I have created a one way clutch in which a full complement of sprags are excited by a few simple leaf springs, thus eliminating need for notching the sprags or the use of garter or ribbon springs heretofore used.

I have further provided a special shaped sprag more responsive to centrifugal force and to a tangential excitation force, a sprag which may be manufactured by the drawing process in long lengths and cut to suitable lengths and which may be assembled in four distinctly different manners to provide different one way clutch assemblies of four different characters.

While several embodiments of this invention have been shown and described in detail, it will be understood that they are illustrative only and will not be taken as a definition of the scope of the invention, reliance being had for this purpose to the appended claims.

What is claimed is:

1. A one way clutch comprising inner and outer concentric cylindrical races, a series of tiltable grippers adapted to be mounted between the concentric races to engage the races when they are tilted in one direction and to release the races when they are tilted in the opposite direction, said grippers having arcuate ends for contact with said coaxial races, one side concave at its mid section, an opposite side convex at its mid section, resilient spacer elements lying between two adjacent grippers at two or more stations to spread the gripper members apart thereby to set up a circumferential force acting upon all grippers tending to tilt said grippers into engagement with both inner and outer races, said resilient spacers being compressed by the grippers at all times, the majority of said grippers contacting each other directly.

2. A one way clutch comprising inner and outer concentric cylindrical races, a series of tiltable grippers adapted to be mounted between the races to engage the races when they are tilted in one direction and to release the races when they are tilted in the opposite direction, said grippers having arcuate ends for contact with the races with one side of each gripper being concave at its midsection and the opposite side being convex at its midsection, said grippers being assembled and balanced so that centrifugal force acting thereon tends to tilt the grippers into engagement with the races.

3. A one way clutch sprag for connecting inner and outer coaxial races having a convex face and an opposite concave face for the purpose of increasing the tilting effect due to centrifugal force to excite engagement.

4. A one way clutch comprising inner and outer concentric cylindrical races, a series of tiltable grippers adapted to be mounted between the concentric races to engage the races when they are tilted in one direction and to release the races when they are tilted in the opposite direction, said grippers having arcuate ends for contact with said coaxial races, one side concave at its mid section, an opposite side convex at its mid section, said grippers assembled so that centrifugal force holds said grippers out of engagement above a pre-determined speed.

5. A sprag type gripper for use in a one way clutch, said gripper having arcuate ends for contact with inner and outer cylindrical races, one side of the gripper comprising a single concave face at its mid section, the opposite face formed convex at its mid section, the convex faces to contact concave faces when assembled, said convex concave faces formed so that a force tending to spread the grippers apart also produces a force tending to tilt several grippers in a direction to engage the races.

6. A sprag type gripper to be used in one way clutches having arcuate ends to contact inner and outer cylindrical races, having one side comprising a single concave face at its mid section, and the opposite side face convex at its mid section.

References Cited in the file of this patent

UNITED STATES PATENTS

| | | |
|---|---|---|
| 1,694,377 | De Lavaud | Dec. 11, 1928 |
| 2,024,109 | Nardone | Dec. 10, 1935 |
| 2,476,377 | Le Clair | July 19, 1949 |
| 2,477,176 | Gruenberg et al. | July 26, 1949 |
| 2,881,886 | Troendly et al. | Apr. 14, 1959 |
| 2,973,072 | Ferris | Feb. 28, 1961 |

FOREIGN PATENTS

| | | |
|---|---|---|
| 637,610 | France | Feb. 6, 1928 |
| 1,047,637 | France | July 22, 1953 |